Patented July 15, 1924.

1,501,645

UNITED STATES PATENT OFFICE.

JOSEPH BRESLAUER AND CHARLES GOUDET, OF GENEVA, SWITZERLAND, ASSIGNORS TO THE FIRM: SOCIÉTÉ D'ETUDES CHIMIQUES POUR L'INDUSTRIE, OF GENEVA, SWITZERLAND.

FERTILIZER AND PROCESS FOR THE MANUFACTURE OF SAME.

No Drawing.     Application filed June 22, 1922.   Serial No. 570,239.

*To all whom it may concern:*

Be it known that we, JOSEPH BRESLAUER and CHARLES GOUDET, both citizens of Switzerland, residing at Geneva, Canton of Geneva, in the Confederation of Switzerland, have invented certain new and useful Improvements in Fertilizer and Processes for the Manufacture of Same, of which the following is a specification.

In the manufacture of assimilable nitrogen compounds from metal cyanamides more especially of raw calcium cyanamide by the decomposition of the latter by means of acids, more especially gaseous acids such as carbonic acid ($CO_2$) and sulphurous acid ($SO_2$), there is obtained as residue a mixture of calcium carbonate or calcium sulphite, the carbonate or sulphite of metals like the iron and aluminum, carbon or other impurities, which occur in ordinary commercial calcium cyanamide. These residues, which even in a dry condition exceed by 20 to 25 per cent the amount of raw calcium cyanamide employed form a waste material that takes up a large amount of space and by reason of its volume is liable to become a serious source of danger for this artificial manure industry.

It has already been sought to employ these residues alone or mixed with other concentrated manures, as fertilizers for soils which are poor in limestone. This use however has great disadvantages.

According to the present invention these residues can be employed for the manufacture of nitrogenic manures, when they are treated in a suitable manner.

The residues of the decomposition of raw calcium cyanamide by means of carbonic acid contain, when they come from the filter press, up to 50 per cent water. They dry rapidly in the air and are in that way converted into a powder without requiring the use of any fuel for producing heat. This powder can be easily handled and is composed of a mixture of calcium carbonate and carbon and contains no more than 5 per cent of water.

When anhydrous sulphurous acid ($SO_2$) has been employed for decomposing the calcium cyanamide the residues obtained contain calcium sulphite instead of calcium carbonate.

This powder dried in the air can be converted into a product which may be used as manure in agriculture. For this purpose this powder or even the moist residues are treated with solutions of urea, of salts, of urea or other solutions of nitrogenous compounds which are assimilable by plants and come from the manufacture of urea or other assimilable nitrogenous compounds obtained from calcium cyanamide.

After this treatment the mixture is again dried, advantageously in the air, whereafter a product is obtained, which forms a good fertilizer.

Instead of urea solutions of other products which are assimilable by plants may be used for instance solutions of ammonium nitrate, nitrate of urea, sodium nitrate, potassium nitrate and other salts of potassium and the like, the direct use of which offers some drawbacks or the concentration of which would need a supplementary expense of fuel. Some of these nitrates can also present the disadvantage as being explosive when they are in a dry state.

It is for instance well known that the ammonium nitrate offers some danger of explosion when it is exposed at a certain heat, as it may happen when it is stored in great quantity. When this salt is mixed with residues of the decomposition of calcium cyanamide by means of carbonic or sulphurous acids, its particles are separated the one from the others by the inert particles of the said residues which contain calcium carbonate or calcium sulphite and carbon.

In this case a gray and dry powder is obtained, which is not explosive and can advantageously be employed as nitrogenic manure.

In the following there will be given some examples of carrying out the process according to the present invention.

First example.

50 kilograms of residues from the decomposition of raw calcium cyanamide by means of carbonic acid ($CO_2$) after having been dried in the air are mixed with 100 kg. of a concentrated solution of sulphate of urea or of free urea obtained for instance during the manufacture of urea from cyanamide. The mixture obtained is evaporated in the open air or in a room which is sufficiently ventilated for allowing the water to escape. After the latter is evaporated a mixture is obtained which contains calcium carbonate, carbon and urea and in which the amount of nitrogen may be varied ad libitum according to the proportion of residues mixed with the solution used and the concentration of the latter. This mixture may be advantageously employed as a manure containing nitrogen, calcium carborate and carbon.

When the residues dried in the air and coming from the decomposition of calcium cyanamide by means of sulphurous acid ($SO_2$) are converted in the above described manner, a product is obtained, which contains calcium sulphite, urea and carbon and which is also very efficacious when it is used as a fertilizer.

*Second example.*

Dry residues from the decomposition of raw calcium cyanamide by means of anhydrous carbonic acid, containing calcium carbonate and carbon are mixed with a concentrated solution of ammonium nitrate, the quantity of which is calculated in order to obtain in the final product the nitrogenic manure having the desired yield of nitrogen.

The mixture obtained is spread out in thin layers in the open air and permitted to dry. After drying a gray powdered product is obtained, which may be easily handled. This product forms an excellent fertilizer and does not present any drawback such as the causticity of the calcium cyanamide. The explosive properties of ammonium nitrate are annihilated by the presence of the inert material formed by the calcium carbonate and carbon which are contained in the residues employed.

Instead of ammonium nitrate or other nitrates one can employ in the above described manners the solutions of several potassium salts and obtain as final products mixed manures and even complete manures by drying the solutions of suitable phosphates.

We claim as our invention:

1. A process for the manufacture of a fertilizer consisting in utilizing economically the residues from the decomposition of raw cyanamide by gaseous acids, said residues containing calcium salts and carbon and treating the said residues with solutions of compounds which are assimilable by plants to transform the mixture into a fertilizer.

2. A process for the manufacture of a fertilizer consisting in utilizing economically the residues from the decomposition of raw cyanamide by carbonic acid, the said residues containing calcium carbonate and carbon, drying the said residues in the open air, then mixing the said residues with solutions obtained during the manufacture of assimilable nitrogenous products from cyanamide, the resultant mixture being dried and the product adapted to be used as a fertilizer.

3. A process for the manufacture of a fertilizer consisting in employing the residues resulting from the decomposition of raw calcium cyanamide by carbonic acid, the said residues containing calcium carbonate and carbon, drying the said residues in the open air, then mixing the residues with solutions obtained during the manufacture of assimilable nitrogenous products from cyanamide, said solution containing urea, and then drying the mixture to obtain a product that may be used as a fertilizer.

4. A process for the manufacture of a fertilizer consisting in employing residues resulting from the decomposition of raw calcium cyanamide by carbonic acid, the said residues containing calcium carbonate and carbon, then drying the said residues in the open air at ordinary temperature, then mixing the dried residues with solutions containing a urea salt obtained during the manufacture of assimilable nitrogeneous products from cyanamide, then drying the mixture at ordinary temperature to obtain a product which may be used as a fertilizer.

5. A fertilizer consisting in a mixture of residues resulting from the decomposition sof raw calcium cyanamide by corbonic acid, and solutions obtained during the manufacture of assimilable nitrogenous products from cyanamide.

6. A fertilizer consisting of a mixture of residues resulting in the decomposition of raw calcium cyanamide by carbonic acid, the said residues containing calcium carbonate and carbon, and solutions containing a urea salt obtained during the manufacture of assimilable nitrogenous products from cyanamide.

In testimony whereof we have affixed our signatures in presence of two witnesses.

JOSEPH BRESLAUER.
CHARLES GOUDET.

Witnesses:
Dr. Rod. de Wurstanberg,
Wm. E. De Courcy.